United States Patent [19]
Simpkin et al.

[11] Patent Number: 5,207,309

[45] Date of Patent: May 4, 1993

[54] CONCOMITANT MOTION CONTROL DEVICE

[76] Inventors: Steven W. Simpkin, 2308 Crossgate Trail, Birmingham, Ala. 35216; C. Michael Jones, 3529 William & Mary Rd., Hoover, Ala. 35216; David W. McNair, Rte. 13, Box 267F, Jasper, Ala. 35501

[21] Appl. No.: 931,861

[22] Filed: Aug. 18, 1992

[51] Int. Cl.⁵ .............................................. B65G 43/00
[52] U.S. Cl. ...................................... 198/341; 29/407; 29/430; 29/703; 324/378; 324/500; 324/503; 901/7
[58] Field of Search ........................ 198/341; 414/222; 901/1, 7, 20; 29/407, 430, 431, 703, 705; 324/378, 500, 503

[56] References Cited

U.S. PATENT DOCUMENTS

| | | | |
|---|---|---|---|
| 3,283,918 | 11/1966 | Devol | 198/341 |
| 3,818,290 | 6/1974 | Harper et al. | 901/7 |
| 3,958,682 | 5/1976 | Martin | 198/341 |
| 4,086,522 | 4/1978 | Engelberger et al. | 198/341 |
| 4,453,303 | 6/1984 | Leddet | 198/341 |
| 4,589,184 | 5/1986 | Asano et al. | 29/407 |
| 4,669,168 | 6/1987 | Tamura et al. | 901/7 |
| 4,673,075 | 6/1987 | Ueyama et al. | 29/703 |
| 4,674,181 | 6/1987 | Hamada et al. | 198/341 |
| 4,799,581 | 1/1989 | Fujii | 198/341 |
| 5,088,176 | 2/1992 | Koga | 29/430 |

*Primary Examiner*—Joseph E. Valenza
*Attorney, Agent, or Firm*—Veal & Associates

[57] ABSTRACT

A controller for a device moving along a complementary path to a conveyed object, derives basic speed input from the object conveyor and uses a non-invasive sensor system to detect the proximity of the object. The sensor system controls electronic logic which causes a drive unit to match the speed of the device to that of the object over the complementary path. The controller returns the device to the start of the path for iterative utilization.

11 Claims, 6 Drawing Sheets

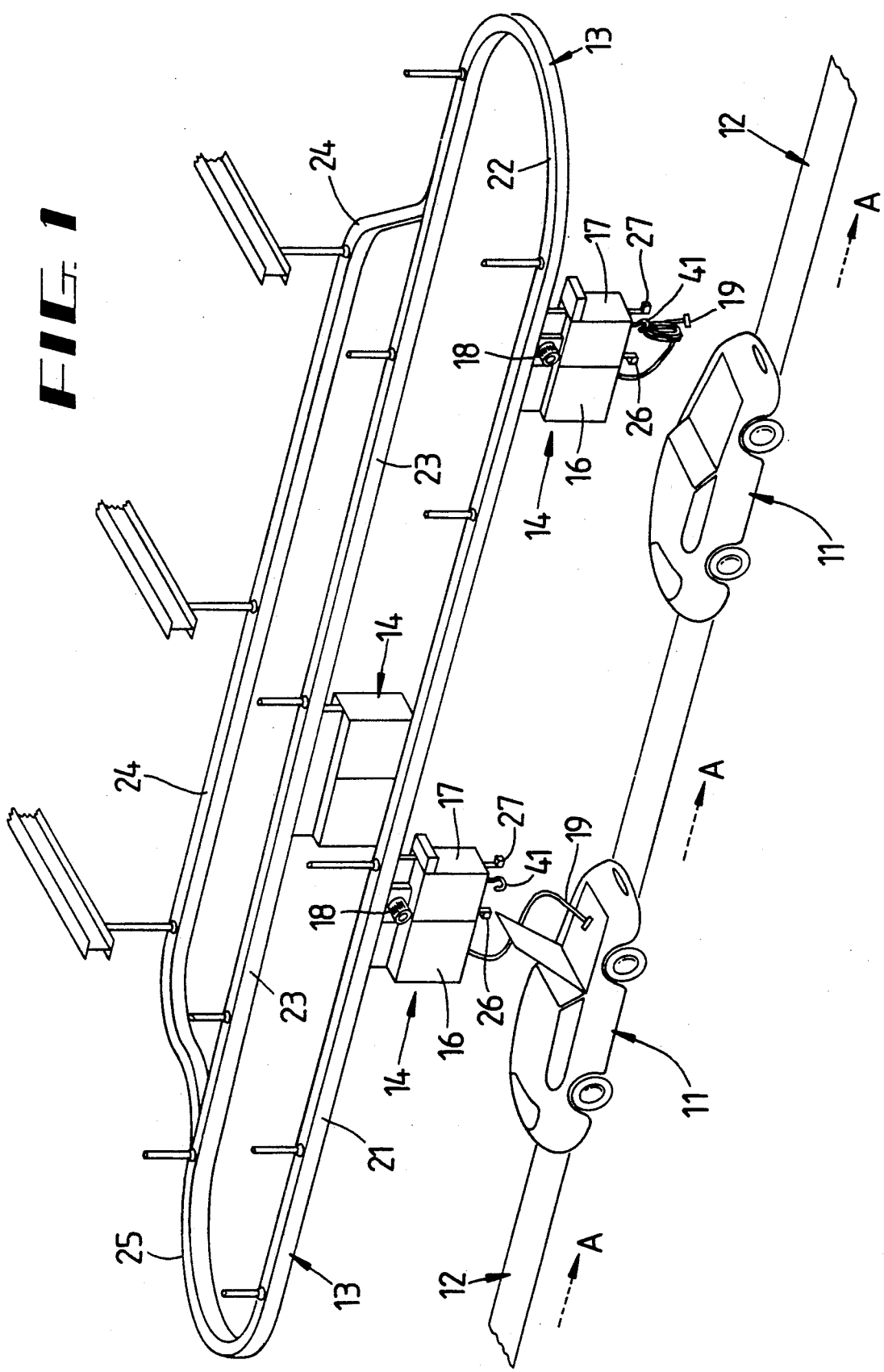

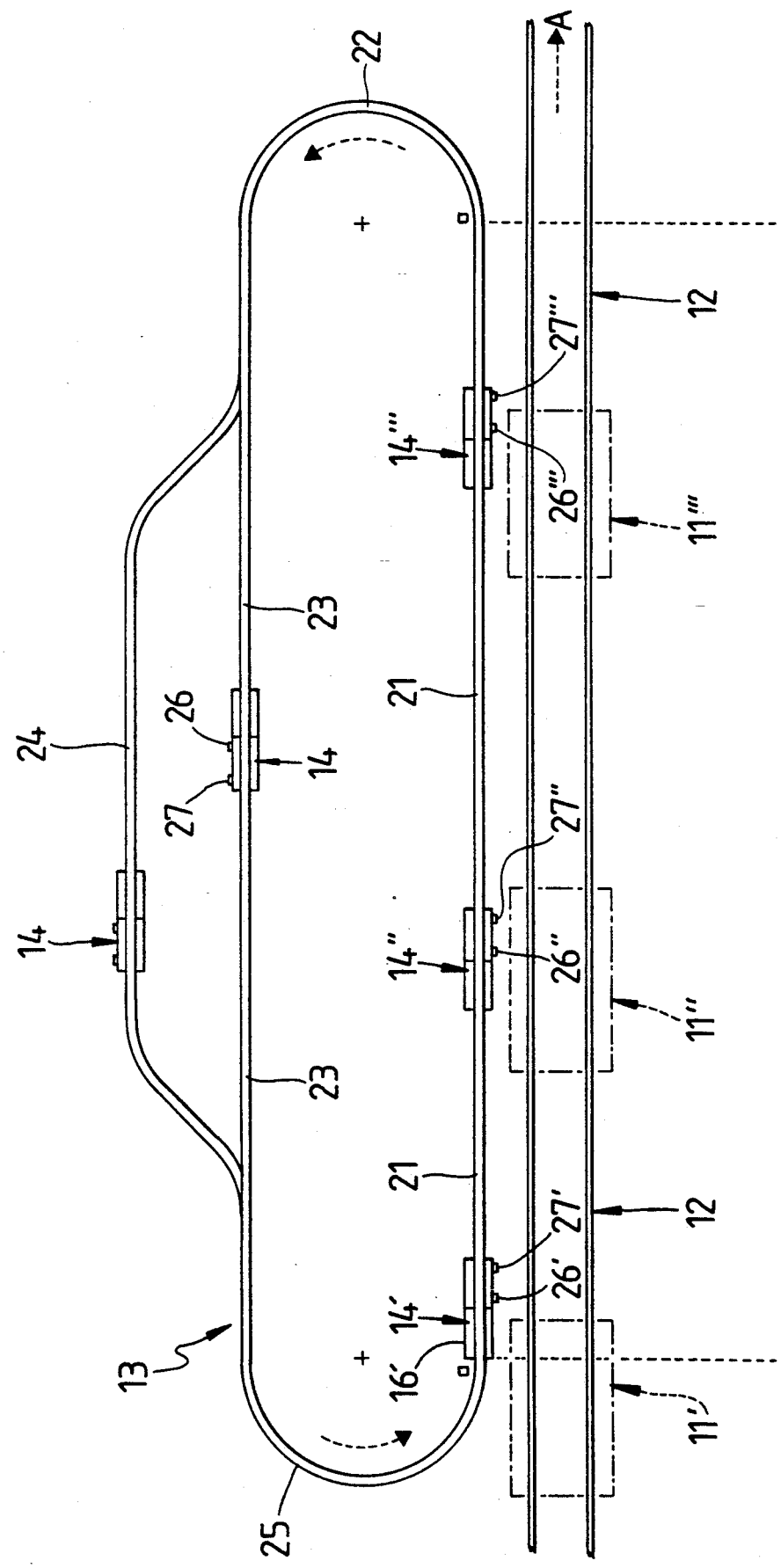

CONCOMITANT MOTION CONTROL DEVICE

FIELD OF THE INVENTION

The present invention relates to the field of materials handling and more particularly to the field of motion control for a workstation or the like which needs to move with or relative to another object. In greater particularity the present invention relates to a control system for a workstation which is to move the workstation concomitantly with a workpiece without physically engaging the workpiece. Still more particularly the present invention relates to a control system which utilizes remote sensors to control the speed of a testing device relative to an object under test which is moving on a separate and independent path.

BACKGROUND OF THE INVENTION

Heretofore in the general field of the invention it has been known to pass a series of objects along a first conveyor such that one or more workstations could perform selected operations on the object as it traverses the conveyor. Similarly, packaging apparatus or painting apparatus are sometimes variably positionable relative to objects moving on a conveyor, however, for the most part, devices known to me have utilized some form of mechanical coupling or some timing functions to correlate the movement of the devices relative to one another. Such devices are exemplified in the following U.S. Pat. Nos. 3,587,087; 3,283,918; 4,673,075; 4,870,921; 4,924,996; and 4,842,123.

In the automotive industry, the improvements in automation and testing during assembly continue to require new labor saving and quality improving features. One such improvement involves electronic testing of the electrical systems of the automobile. It is possible to connect an electronic testing device to predetermined terminals in the partially completed vehicle assembly and perform, within a reasonably short period of time, a plurality of tests and checks to insure the integrity of the system. Familiarity with the automation of the industry reveals that although such testing may be performed in a short period of time, the continual process of building automobiles is significantly hampered if this testing step requires the automobiles to stop and thus accumulate while the testing is performed. This is certainly true in other automated fields of endeavor, however, the automotive field is the most familiar. In some applications it is important to be able to contact the object such as an automobile with a testing mechanism or the like, but without thereby affecting the movement of the object along a predetermined path. It is also desirable to move the testing mechanism concomitantly with the object under test without any physical connection to insure such concomitant motion. This is particularly true where no readily available connecting means are present which can be attached to the tester and the object while they are moving without some danger or complexity. Accordingly, there exists a need for an automated system that will move a test unit or workstation concurrently with an object on an independent transport means without the necessity of mechanical connection therebetween.

SUMMARY OF THE INVENTION

It is the object of the present invention to provide a control system which will maintain the position of a device adjacent a moving object without the necessity for mechanical contact therebetween to maintain the relationship.

Another object of the invention is to provide a system that allows a plurality of devices to move concomitantly with a plurality of objects on a common track without interference with each other and with each device being independently movable to a starting position for iterative use with subsequent objects.

Yet another object of the invention is to provide a system wherein variable speeds may be utilized to maintain the devices or return the devices for iterative use.

Still another object of the invention is to eliminate costly delays in processing or testing an object by moving the workstation concomitantly therewith.

These and other objects and features of my invention are advantageously accomplished in my unique combination of sensors, circuitry and drive mechanisms which allow a device such as a testing unit to be independently yet concomitantly urged along a path adjacent the path of another object. To accomplish this we obtain a control reference signal from the carrier conveying the objects and use that signal as a control for a drive unit mounted to a separate track having a portion thereof contiguous with the object carrier. The drive unit thus moves a tester or workstation along the separate track at the same base speed as the object. A pair of acoustical sensors are positioned to receive reflected energy from the object and are operatively connected in a circuit that varies the input control signal to the drive unit in accordance with the output of the sensors. Anti-collision sensors and warning sensors are provided to enable usage of multiple testers and drive units on a single track.

BRIEF DESCRIPTION OF THE DRAWINGS

Apparatus embodying features of my invention are depicted in the accompanying drawings, which form a portion of this disclosure and wherein:

FIG. 1 is a perspective pictorial view of an automotive testing area utilizing my invention;

FIG. 2 is a plan view of a track layout using my invention;

DESCRIPTION OF A PREFERRED EMBODIMENT

Figure 4:
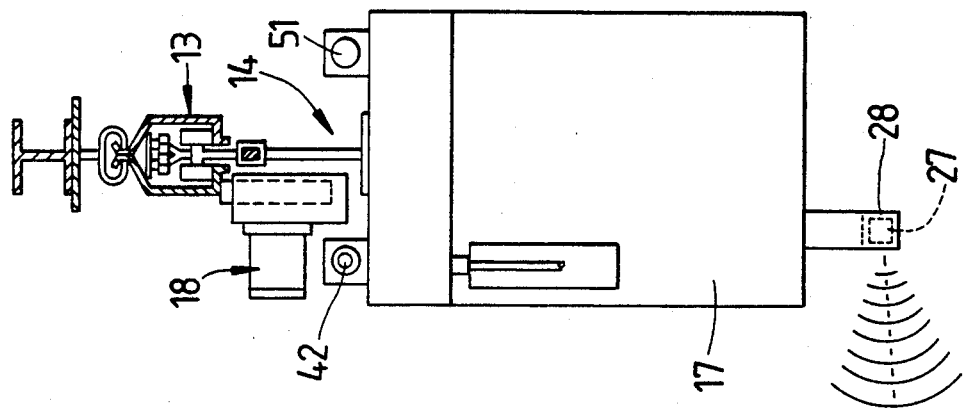
FIG. 4 is a front elevational view of the unit shown in FIG. 3.

Referring to the drawings for a clearer understanding of the invention, it may be seen in FIG. 1 that an automotive testing area may utilize the invention for testing the electronic circuits of the vehicle. As shown therein a plurality of vehicles 11 are moved sequentially along a conveyor 12 in the direction of arrow A through the area in which electronic testing is to be performed. The specific type conveyor is immaterial as long as a reference voltage indicative of its speed may be obtained for use as hereinafter described. Adjacent the conveyor 12 is a monorail 13 which supports thereon a plurality of units 14 which are used to test the vehicle 11 as they move along the conveyor. Each unit is shown in greater detail in FIGS. 3 and 4 and contains a test unit 16 which may for example be an electronic test unit or some other device, a control unit 17 and a drive unit 18. The present invention resides primarily in the control unit which allows a test unit 16 to maintain its position relative to a car 11 by controlling drive unit 18. Typically a test unit 16 will have an electrical connection 19 to the vehicle 11, however no other direct physical contact is required.

Referring to FIG. 1 and 2, monorail 13 includes a track which includes a portion 21 parallel and contiguous to conveyor 12, a curved end portion 22 which diverges from conveyor 12, a return portion 23, a side track 24 for maintenance or storage of the units 14, and a second curved end 25. The monorail serves to support the unit and in some applications may be used as a part of the power supply and telemetry circuit for the test device, however, such matters are beyond the scope of the present invention except that the monorail may be used to provide a path for a reference voltage input to the control unit 17 and a power supply path to the drive and control units.

As can be seen in FIGS. 1-4, each control unit 17 includes thereon a pair of spaced apart sensors 26 and 27, which when used with automobiles are preferentially acoustic sensors, which are laterally oriented and tuned to detect the presence of an object at a given distance by the energy reflected therefrom. That is to say the sensor generates an acoustic signal which is reflected by the object and then detected, thus it will be appreciated that the term sensor is used herein to mean an energy sending and receiving unit and certain associated circuitry which is responsive to the detection of energy output to and reflected from an object. These sensors 26 and 27 are positioned between baffles 28 such that the reflected energy detected thereby does not originate from another sensor. In FIG. 2 note that three vehicles 11 are depicted on the conveyor 12 and three units 14 are in position relative to the vehicles. Vehicle 11' is about to enter the test area, thus unit 14' has been positioned ahead of vehicle 11' and the electrical connection made via cable 19. (Note that electrical connection for test purposes is referenced herein however such connection is not necessary for the functioning of the invention) so that tester 16' may analyze selected components of vehicle 11' as it moves along the conveyor to the terminal end of the parallel portion 21. Sensors 26' and 27' are thus ahead of the vehicle and neither is detecting reflected energy. Vehicle 11'' is shown in an advanced position relative to unit 14'' such that both sensors 26'' and 27'' are detecting reflected energy. Vehicle 11''' is nearing the end of the test area and positioned relative to unit 14''' such that sensor 26''' is detecting reflected energy while sensor 27''' is not. Of the three conditions illustrated vehicle 11''' is in the desired relationship as will be explained hereinafter with reference of FIGS. 2, 5 and 6.

Figure 5:
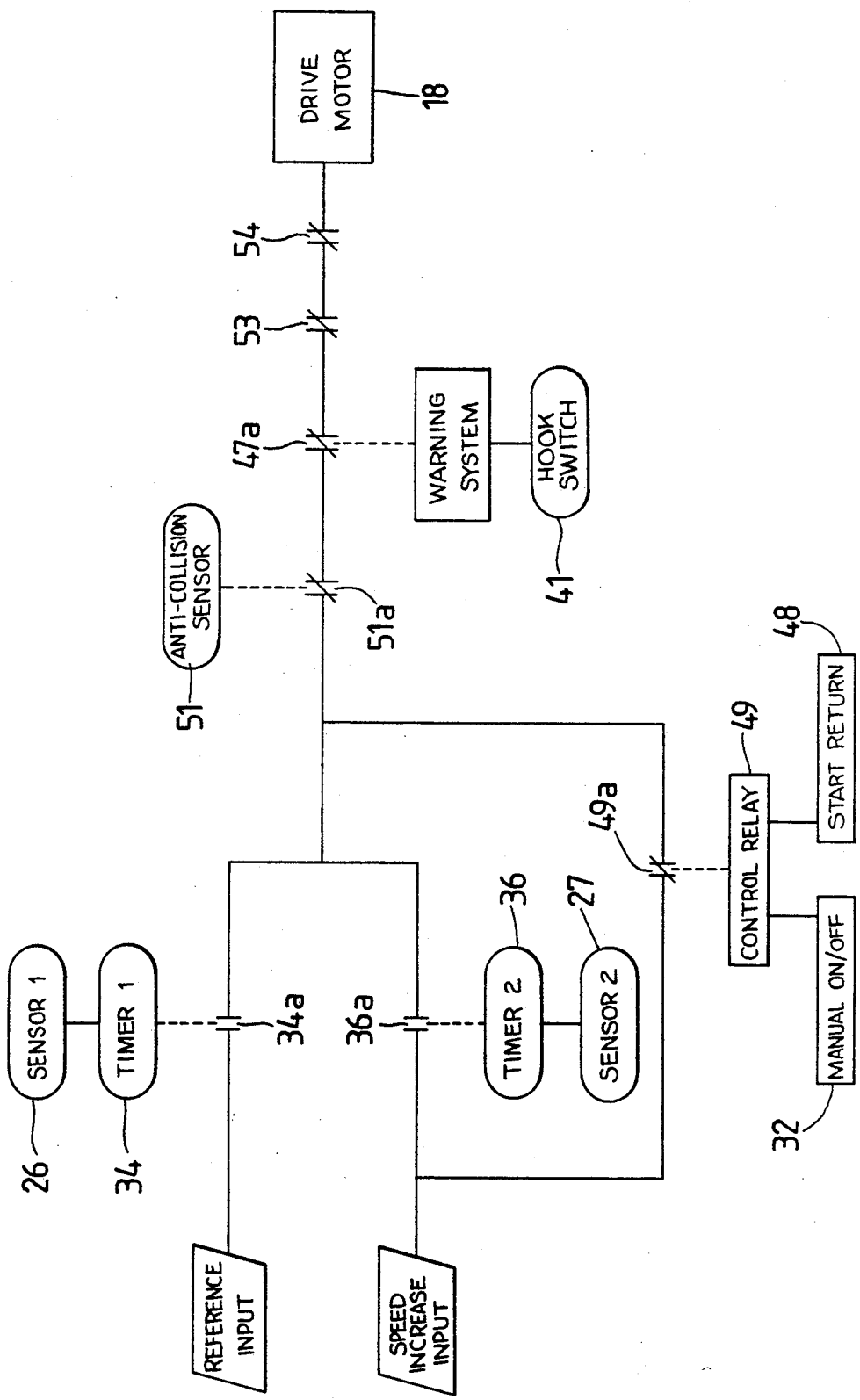
FIG. 5 is a block diagram of the control system.
Figure 6:
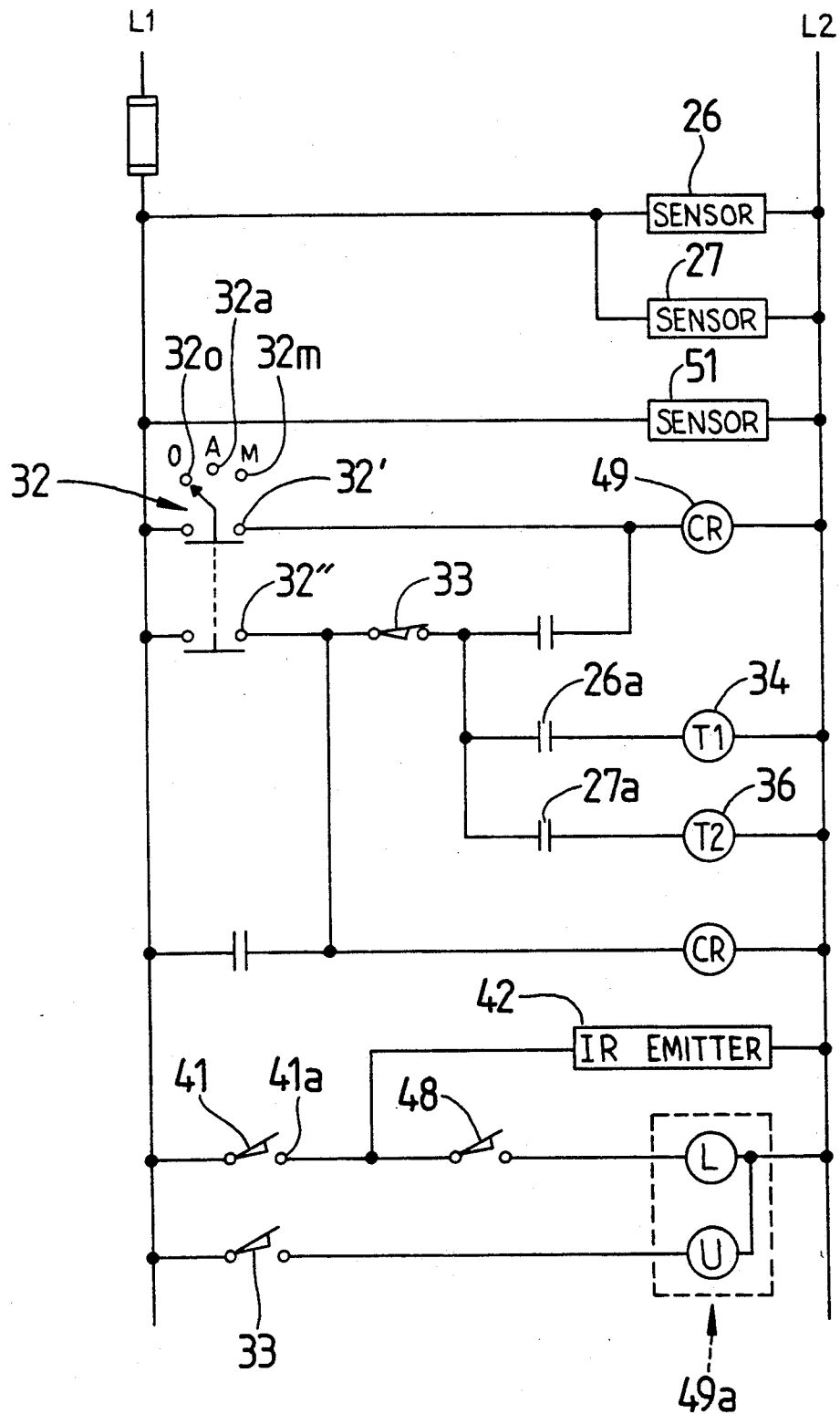
FIG. 6 is a logic diagram of the control system.

FIG. 5 is block diagram of the control system while FIG. 6 is a partial logic wiring diagram of selected parts of the circuit. In FIG. 6 it can be seen that sensors 26 and 27 are energized from the power supply which is connected via a monorail shoe (not shown). An anti-collision sensor 51 whose function is explained hereinafter is likewise energized. Sensor 26 has a pair of contacts 26a which remain open until reflected energy is detected. Likewise sensor 27 includes contacts 27a which remain open until reflected energy is detected. Control unit 17 includes an operator pendant on which a three position switch 32 is located. This switch is spring loaded to an automatic position 32a with a manual position 32m or an open position 32o. In the automatic position a set of contacts 32'' are closed and contacts 32' are open. Contacts 32'' are in line with a switch 33 located at the beginning of the test area. The utilization of stop/return switch 33 is described hereinafter in further detail, however it is noteworthy to mention that this switch serves to stop a unit 14 which has traversed the monorail 13 so that the unit may be subsequently positioned to operate with another vehicle. This switch 33 provides a current path to contacts 26a and 27a. When sensor 26 detects reflected energy contact 26a closes energizing a timer 34 which closes contacts 34a. The timer is a delay/off timer thus contacts 34a remain closed for a period of time after contacts 26a open. The contacts 34a, as seen in FIG. 5, are in the input line from the reference input signal to the drive unit 18, thus until sensor 26 causes timer 34 to close contacts 34a the drive unit does not have an input from the conveyor 12 and thus does not move the unit 14, as is the case with vehicle 11'. If the unit lags behind the vehicle then sensor 27 detects reflected energy and contacts 27a energize timer 36. Timer 36 is a delay/on timer thus at a predetermined time after contacts 27a close a pair of contacts 36a close thus providing a speed increase control voltage into the drive unit 18 through an appropriate voltage divider network not shown, so that the unit can be advanced to the proper relationship.

Figure 7:
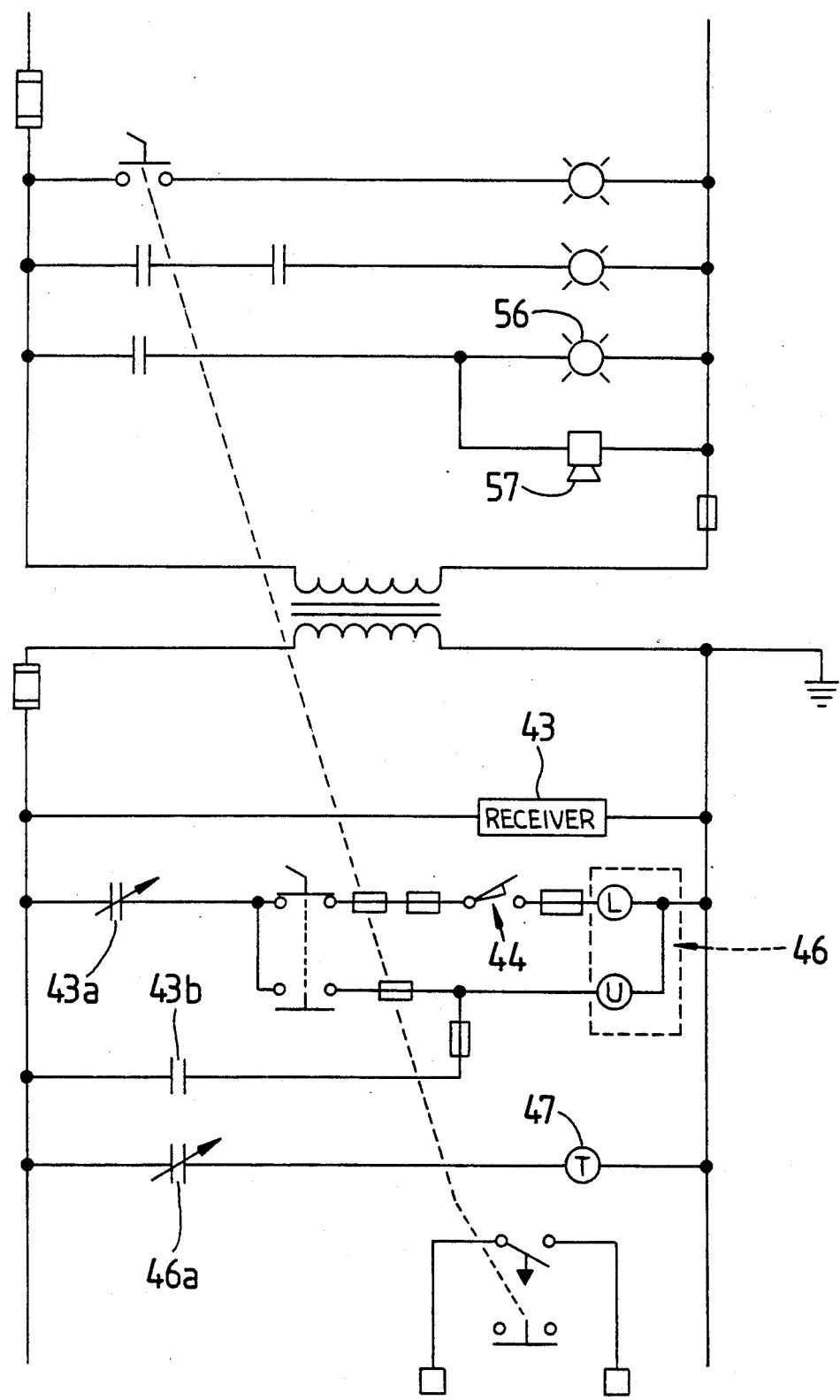
FIG. 7 is a logic diagram of the warning system.

In the foregoing manner unit 14 is maintained in cooperative relation to a vehicle 11 along portion 21 of monorail. However, to provide an efficient system the unit 14 must be returned to the start of portion 21 for iterative use with subsequent vehicles. It is also necessary to insure that the unit does not begin the return while still attached to the vehicle by the electrical test connection. Again note that this electrical test connection is used as an illustration, and it is to be understood that in a different application, a different condition may need to be satisfied before the unit returns. In the embodiment illustrated, the electrical connector is stored on a hook 41 on unit 14. The hook 41 has a switch associated therewith such that a set of contacts (not shown) are closed when the connector is on hook 41 to actuate a warning light 55 and a set of contacts 41a which are closed when the connector is not on the hook 41. Contacts 41a actuate an infrared emitter 42 used in conjunction with a warning system. If the output of the emitter 42 is not detected within the last ten feet of test portion 21 of monorail 13, a receiver 43, shown on FIG. 7, holds a set of contacts 43a in the closed position. A warning zone limit switch 44 would actuate an alarm latch 46 which controls a timer 47 through latch contacts 46a. The timer 47 will stop the system by stopping conveyor 12 as with contacts 47a of FIG. 5 on a given delay. However, if receiver 43 detects emitter 42 then contacts 43a open and contacts 43b close unlatching latch 46 and disabling timer 47.

If hook switch contacts 41a are made, then, a start return switch 48 located at a position on portion 21 will be closed as the unit 14 passes, thereby latching control relay 49. Control relay 49 includes a set of contacts 49a, which close to apply a control input directly to the drive unit 18 independently of the timers or the reference input. This input remains constant until stop return switch 33 unlatches the control relay 49 removing the control input from the drive unit. The manual position of switch 32 on the operator pendant likewise bypasses the anti-collision sensor and timers and enables control relay 49, allowing an operator to position the unit along the monorail 13.

An anti-collision sensor 51 is provided on the forward portion of the unit 14 to detect reflected diffuse infrared radiation which it emits. The sensor 51 has a contact 51a as shown in FIG. 5 which will open the control line to drive unit 18 stopping the unit any time a reflection from an adjacent unit is detected. It should be understood that FIG. 5 is not intended as a schematic wiring diagram but rather is indicative of the logic of the system. Note also that contact 53 of FIG. 5 allows the operator to stop the unit from his pendant 52 and contact 54 allows maintenance personnel to stop the unit from the control panel of the control unit 17.

Figure 3:
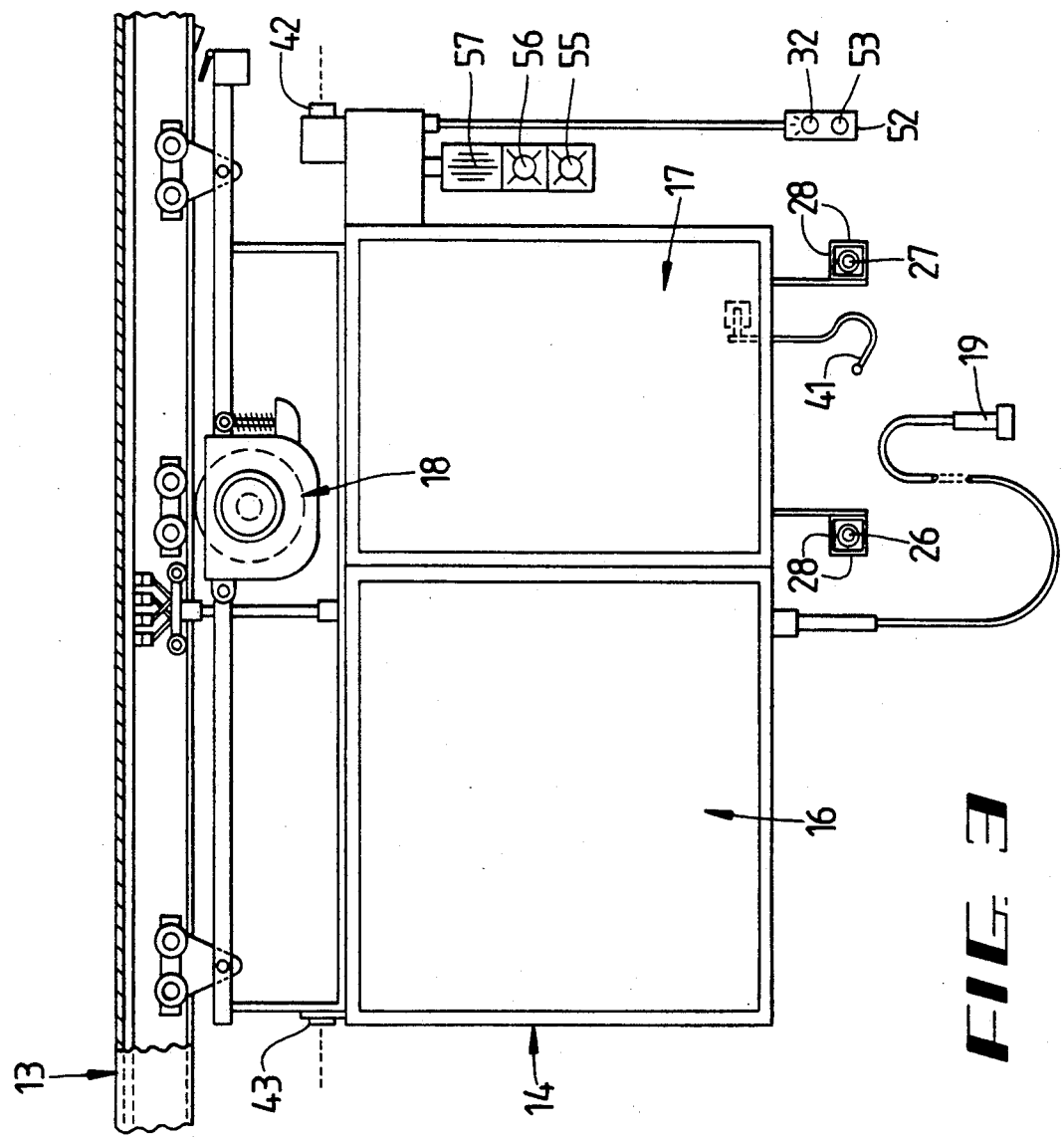
FIG. 3 is a side elevational view of a unit on the automotive tester shown in FIG. 1 including a tester and my control unit.

From the foregoing the following description of the operation of the invention as embodied in a vehicle test facility should be readily understood. An operator, using control pendant 52 attached to the unit 14 will utilize the manual setting of switch 32 to position the unit ahead of a vehicle near the start of monorail portion 21 and the attach the electrical connector 19 of the tester unit 16 to the wiring harness of the vehicle. With switch 32 in the automatic mode, sensor 26 will detect the reflected energy from the front fender of the vehicle as conveyor 12 moves it forwardly, thereby closing contacts 26a, energizing timer 34 and providing the tachometer derived control signals to the drive unit. The contacts 41b on hook switch 41 energize a blue flashing light 55 as shown in FIG. 3 to provide a visual indication that the electrical connector is not on the hook. Sensors 26 and 27 control the logic to maintain the unit 14 adjacent the front fender of the vehicle. If the electrical connection is not replaced at the end of the track portion 21, emitter 42 is not energized and an amber warning light 56 and horn 57 on control unit 17 are actuated by latch 46 through a set of contacts which are not shown. Unless the connector 19 is returned to the hook 41 promptly, timer 47 shuts the system down. If hook switch indicates the connector is supported on the hook 41, then when control relay 49 is actuated, drive unit 18 is given a high speed command input to return the unit to the start of portion 21. An amber light on the unit flashes during the high speed return responsive to the closing of a set of contacts of relay 49 which are not shown. It should thus be clear that the system as described allows the units to be repetitively returned to the start of the test area for iterative use so that vehicles under test may continue along the conveyor unhindered by the test. As will be appreciated, no contact is required with the vehicles, thus there is no possibility of damage thereto and no time lost in attachment thereto. It is also noteworthily to mention that there are no connecting members which endanger or interfere with an operator performing tasks adjacent the test line. In fact it is assumed that operators will pass between the vehicle and the units while testing is progressing, however in the system as described, the movement of the unit will not be affected thereby.

While I have shown my invention in one form, it will be obvious to those skilled in the art that it is not so limited but is susceptible of various changes and modifications without departing from the spirit thereof.

What I claim is:

1. Apparatus for coordinating the movement of a first device along a closed loop path with the movement of an object along a second path parallel to a portion of said closed loop path, comprising:

(a) endless loop track means for supporting said first device;
    (b) variable speed drive means supported on said track means for moving said first device therealong;
    (c) means for remotely sensing the proximity of said object along said portion of said closed loop path mounted for concomitant movement with said drive means and operably connected to vary the speed generated by said drive means responsive to the proximity of said object; and
    (d) sensing means for detecting divergence of said object and said device operably connected to provide control input thereto subsequent to said divergence.

2. Apparatus as defined in claim 1 wherein said coordination means comprises:

(a) a first sensor for detecting reflected energy from said object located at a first position; and
    (b) a second sensor for detecting reflected energy from said object located at a second position spaced from said first position along the direction of movement of said object, such that said first and second sensors detect reflected energy independently of each other, each sensor having an independent output responsive to such detected energy.

3. Apparatus as defined in claim 2 wherein said coordination means includes means responsive to the respective output of said first and second sensors for selectively varying the speed generated by said drive means between a normal operating speed, a set increased speed, and an idle speed.

4. Apparatus as defined in claim 3 wherein said coordination means comprises an electrical circuit comprising:

(a) first timer means operatively connected to said first sensor for maintaining the output of said first sensor for a predetermined period after said first sensor stops detecting said reflected energy; and
    (b) a second timer operatively connected to said second sensor for delaying the output of said second sensor for a predetermined period after said second sensor begins detecting said reflected energy.

5. Apparatus as defined in claim 4 wherein said first timer is operably connected to provide a first control voltage to said drive means responsive to detection of reflected energy by said first sensor such that said drive means generates a normal drive speed, and said second timer is operably connected to provide a second control voltage to said drive means responsive to detection of reflected energy by said second sensor such that said drive means generates an increased speed responsive to detection of reflected energy by both sensors.

6. Apparatus as defined in claim 1 wherein said coordination means comprises a pair of acoustic sensors spaced from one another for independently receiving reflected acoustic energy from said object.

7. Apparatus as defined in claim 1 wherein said sensing means comprises:

(a) means for detecting when said drive means has reached a terminal end of said portion of said closed loop path; and
    (b) means for detecting whether said device is connected to said object operatively connected to stop said object and said device if said device and object are connected at a predetermined point subsequent to said end of said portion of said closed loop path.

8. Apparatus as defined in claim 7 further comprising secondary means for selectively providing a control input to said variable speed drive such that said device is moved independently of said coordinating means.

9. Apparatus as defined in claim 8 wherein said secondary means includes manual input means for providing said control input in any segment of said track and means for automatically providing said control input to move said device from said terminal end to a position near a beginning end near said portion.

10. Apparatus as defined in claim 1 wherein said sensing means includes manual input means for providing apparatus as defined in claim 8 wherein said sensing means includes manual input means for providing said control input in any segment of said track and means for automatically providing said control input to move said device from said terminal end to a position near a beginning end near said portion.

11. Apparatus as defined in claim 10 wherein more than one device is supported on said track with each device having associated therewith independent drive means and coordinating means and further comprising anti-collision means for preventing contact between said devices by sensing the presence of another device in forward proximity thereto.

* * * * *